(12) United States Patent
Tanaka et al.

(10) Patent No.: US 11,608,024 B2
(45) Date of Patent: Mar. 21, 2023

(54) AIRBAG DEVICE

(71) Applicant: TOYODA GOSEI CO., LTD., Kiyosu (JP)

(72) Inventors: Motoyuki Tanaka, Kiyosu (JP); Akira Yamashita, Kiyosu (JP); Shinichi Ishida, Kiyosu (JP); Yoshio Ono, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/747,262

(22) Filed: May 18, 2022

(65) Prior Publication Data

US 2022/0379835 A1 Dec. 1, 2022

(30) Foreign Application Priority Data

May 31, 2021 (JP) .............................. JP2021-091293

(51) Int. Cl.
*B60R 21/2338* (2011.01)
*B60R 21/239* (2006.01)
*B60R 21/264* (2006.01)

(52) U.S. Cl.
CPC ........ *B60R 21/2338* (2013.01); *B60R 21/239* (2013.01); *B60R 21/264* (2013.01); *B60R 2021/23384* (2013.01)

(58) Field of Classification Search
CPC . B60R 21/239; B60R 21/264; B60R 21/2338; B60R 2021/23384
See application file for complete search history.

(56) References Cited

U.S. PATENT DOCUMENTS

| 7,591,482 B2 * | 9/2009 | Thomas .............. B60R 21/2338 |
| | | 280/739 |
| 8,388,021 B2 * | 3/2013 | Mitsuo .................. B60R 21/239 |
| | | 280/743.2 |
| 2009/0301339 A1 | 12/2009 | Ito et al. |

FOREIGN PATENT DOCUMENTS

| JP | 2009293785 A | 12/2009 | | |
| WO | WO-2011157631 A1 * | 12/2011 | ........... | B60R 21/233 |
| WO | WO-2021113078 A1 * | 6/2021 | ........... | B60R 21/017 |

* cited by examiner

*Primary Examiner* — Faye M Fleming
(74) *Attorney, Agent, or Firm* — Posz Law Group, PLC

(57) ABSTRACT

An airbag device includes an actuator of a configuration that causes a string-form coupling member extending from an airbag to be coupled, and controls an inflation aspect of the airbag by causing a state of coupling with the coupling member to be maintained or terminated. The actuator includes a gas generator that can eject a combustion gas and a holder portion that can hold the coupling member. The holder portion includes a holding wall portion, which can hold the wound coupling member on an outer peripheral face side, and a top wall portion that closes a leading end side of the holding wall portion, and a contact region in which the combustion gas can be brought into contact with the coupling member is disposed in a region of the holding wall portion. The actuator causes the coupling member to be severed by causing the combustion gas to come into contact with the coupling member in the contact region, whereby a state of the coupling member being held in the holder portion can be terminated.

5 Claims, 13 Drawing Sheets

US 11,608,024 B2

AIRBAG DEVICE

CROSS REFERENCE TO RELATED APPLICATIONS

The present application claims priority from Japanese Patent Application No. 2021-91293 of Tanaka et al., filed on May 31, 2021, the entire disclosures of which is incorporated herein by reference.

BACKGROUND

1. Technical Field

The present disclosure relates to an airbag device that has an actuator for controlling an airbag inflation state.

2. Description of Related Art

As an existing actuator used for controlling an airbag inflation state in an airbag device, there is an actuator of a configuration including an actuator main body, which has an operating pin that causes a coupling member extending from an airbag to be coupled by the coupling member being passed therethrough, and a supporting plate portion, which is formed protruding from a housing region and can support a leading end side of the operating pin through which the coupling member is inserted, as shown in JP-A-2009-293785. This actuator is such that the actuator main body has a piston, which has the operating pin, and a cylinder case that holds the piston while causing the operating pin to protrude, and is mounted in a vehicle in a state wherein the coupling member extending from the airbag is caused to penetrate the operating pin protruding from the cylinder case, and the leading end side of the operating pin is brought into contact with the supporting plate portion. In a state wherein the actuator main body is not caused to operate, the airbag inflates in a state wherein the coupled state of the coupling member and the operating pin is maintained, and when the actuator main body is caused to operate, the actuator main body is operated in such a way that the operating pin is drawn into the cylinder case, and the airbag inflates in a state wherein the coupled state of the coupling member and the operating pin is terminated.

However, as an airbag device in which the existing actuator is used is such that the actuator is of a configuration wherein a state of coupling with the coupling member is terminated by the actuator being caused to operate in such a way that the operating pin is drawn into the cylinder case, a configuration is not simple, and there is room for improvement in terms of achieving a simple configuration and reducing manufacturing cost.

SUMMARY

The present disclosure relates to an airbag device of the following configuration.

The airbag device includes an airbag that inflates in such a way as to be able to protect an occupant seated in a seat owing to an inflating gas being caused to flow into an interior, a housing region in which the airbag is housed folded, and an actuator, which is attached to the housing region side and is of a configuration that causes a coupling member extending from the airbag to be coupled, and controls an inflation aspect of the airbag by causing a state of coupling with the coupling member to be maintained or terminated, wherein the coupling member is configured of a string-form body having flexibility, the actuator is configured of a gas generator configured in such a way as to be able to eject a combustion gas generated by a combustion of an explosive housed in an interior from an ejection port when operating, and a holder portion around which the coupling member can be wound and held, the holder portion includes a holding wall portion, which is disposed in such a way as to approximately follow a direction of ejection of the combustion gas from the ejection port and can hold the wound coupling member on an outer peripheral face side, and a top wall portion disposed in such a way as to close a leading end side separated from the gas generator in the holding wall portion, and is configured in such a way that a contact region in which the combustion gas can be brought into contact with the coupling member is disposed in a region of the holding wall portion from the ejection port to the top wall portion, and the actuator is configured in such a way that the coupling member is severed by the combustion gas being brought into contact with the coupling member in the contact region, whereby a state of the coupling member being held in the holder portion can be terminated.

BRIEF DESCRIPTION OF DRAWINGS

FIGS. 8A and 8B are schematic views showing a region in a periphery of an exhaust hole in the airbag of FIG. 7, wherein FIG. 8A shows a closed state of the exhaust hole, and FIG. 8B shows an opened state of the exhaust hole;

FIGS. 9A and 9B are schematic vertical sectional views of the actuator in the airbag device of the embodiment, wherein FIG. 9A shows a state of the actuator before operating, and FIG. 9B shows a state of the actuator after operating;

FIGS. 10A and 10B are schematic vertical sectional views of a region of a holding wall portion in the actuator in the airbag device of the embodiment, wherein FIG. 10A shows a state of the actuator before operating, and FIG. 10B shows a state of the actuator after operating;

FIGS. 13A and 13B are schematic vertical sectional views of a region of a holding wall portion in the actuator in the airbag device of FIG. 11, wherein FIG. 13A shows a state of the actuator before operating, and FIG. 13B shows a state of the actuator after operating.

DETAILED DESCRIPTION

Exemplary embodiments of the present disclosure are described below with reference to the accompanying drawings. However, the invention is not limited to the embodiments disclosed herein. All modifications within the appended claims and equivalents relative thereto are intended to be encompassed in the scope of the claims.

Figure 1:
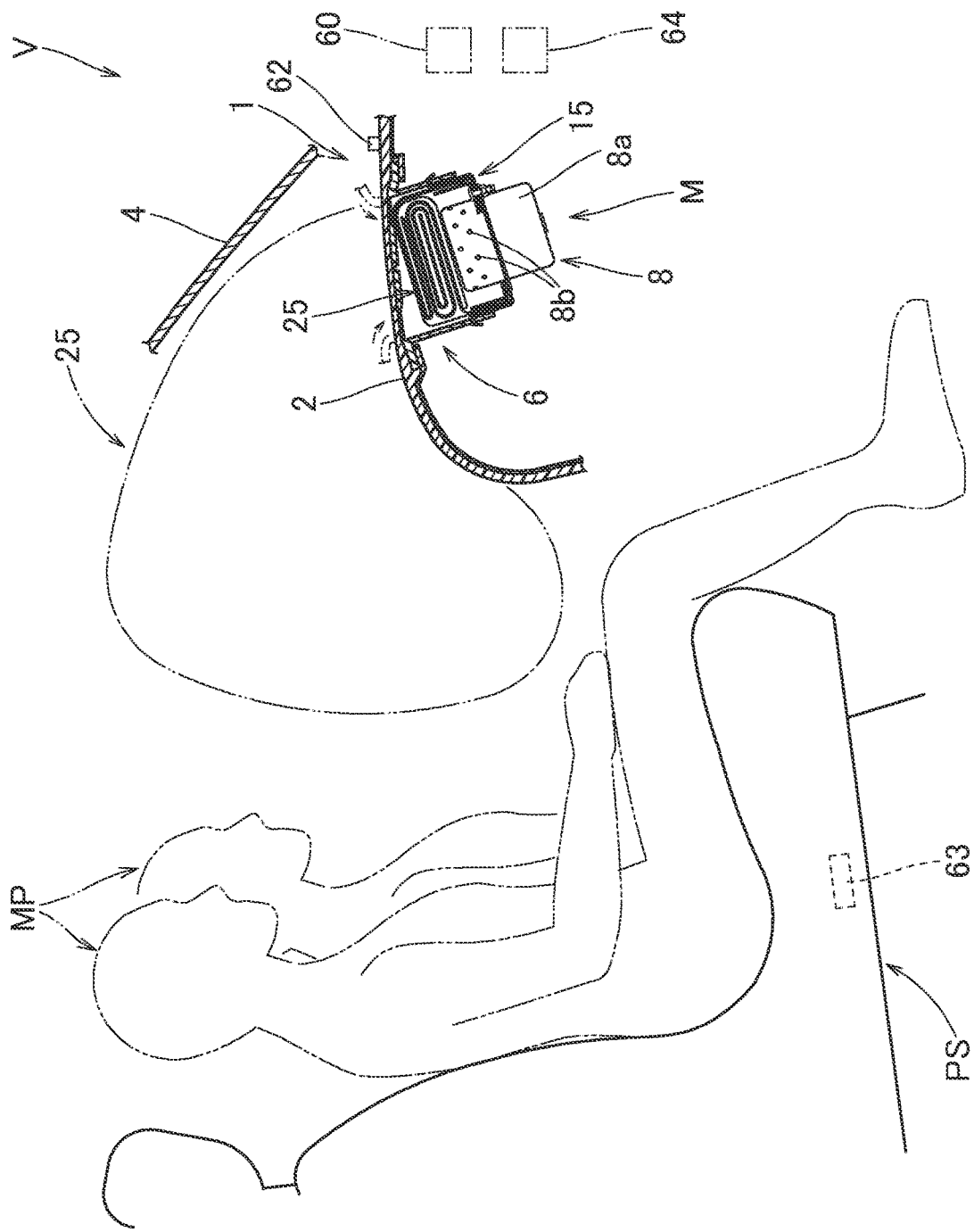
FIG. 1 is a schematic view showing a passenger seat airbag device that is one embodiment of the disclosure.

Hereafter, one embodiment of the disclosure will be described, based on the drawings. In the embodiment, the description will be given employing a passenger seat airbag device as an example of an airbag device M. As shown in FIG. 1, the passenger seat airbag device M (hereafter abbreviated as "airbag device") is disposed in an interior of an upper face 2 of an instrument panel 1 in front of a passenger seat PS in a vehicle V. In the embodiment, front-rear, up-down, and right-left directions coincide with front-rear, up-down, and right-left directions of the vehicle V, unless stated otherwise.

Figure 2:
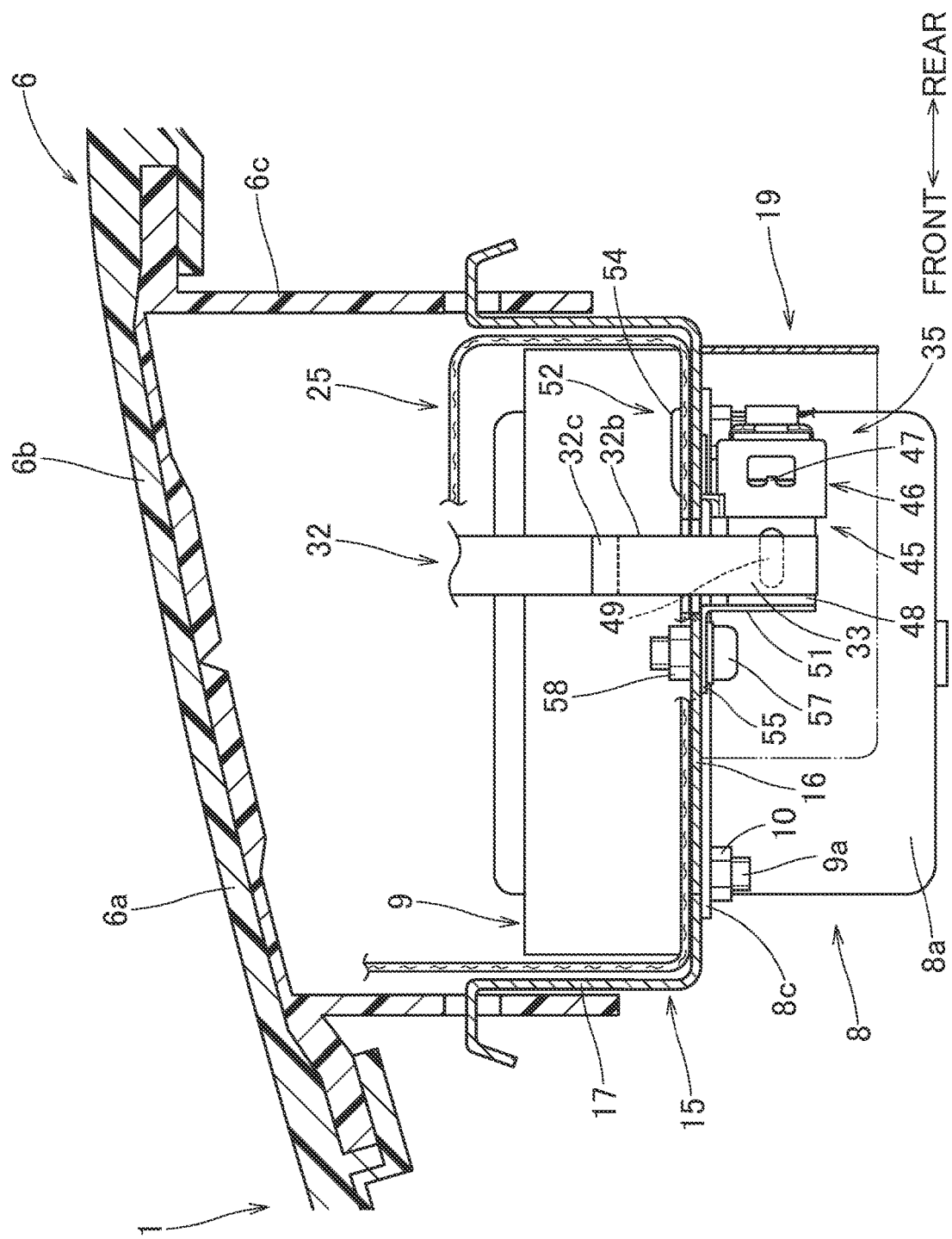
FIG. 2 is a vertical sectional view of the passenger seat airbag device of the embodiment.

As shown in FIGS. 1 and 2, the airbag device M includes a folded airbag 25, an inflator 8 that supplies an inflating gas to the airbag 25, a case 15 acting as a housing region that houses and holds the airbag 25 and the inflator 8, an airbag cover 6 that covers the folded airbag 25, a retainer 9 for attaching the airbag 25 and the inflator 8 to the case 15, and an actuator 35 that controls an inflation state of the airbag 25. The airbag device M of the embodiment is such that the inflator 8 and a gas generator 37, to be described hereafter, in the actuator 35 are configured in such a way that operation is controlled by a control device 60 shown in FIG. 1.

As shown in FIG. 1, the control device 60 causes the inflator 8 to operate by causing an input of electrical signals from a position detecting sensor 62, which can detect a physique of an occupant MP sitting in the passenger seat PS and a distance of separation between the instrument panel 1 and the occupant MP, a weight detecting sensor 63 that can detect a weight of the occupant MP, a collision detecting sensor 64 that can detect an acceleration of the vehicle V and a direction of acceleration, and the like, and causes the gas generator 37 of the actuator 35 to operate. In the case of the embodiment, the gas generator 37 is disposed in order to control a rise in internal pressure of the airbag 25 when the airbag 25 inflates when the inflator 8 operates. Specifically, an operation of the gas generator 37 is controlled by the control device 60 in such a way as to cause the airbag 25 to inflate in a preferred inflation mode by causing an inflating gas IG that has flowed into the airbag 25 to be discharged to an exterior of the airbag 25.

As shown in FIGS. 1 and 2, the inflator 8 includes an approximately cylindrical main body portion 8a, which has a multiple of gas discharge ports 8b, and a flange portion 8c for attaching the inflator 8 to the case 15. Unshown through holes through which bolts 9a of the retainer 9 are inserted are formed in the flange portion 8c. The inflator 8 is electrically connected to the control device 60.

Figure 3:
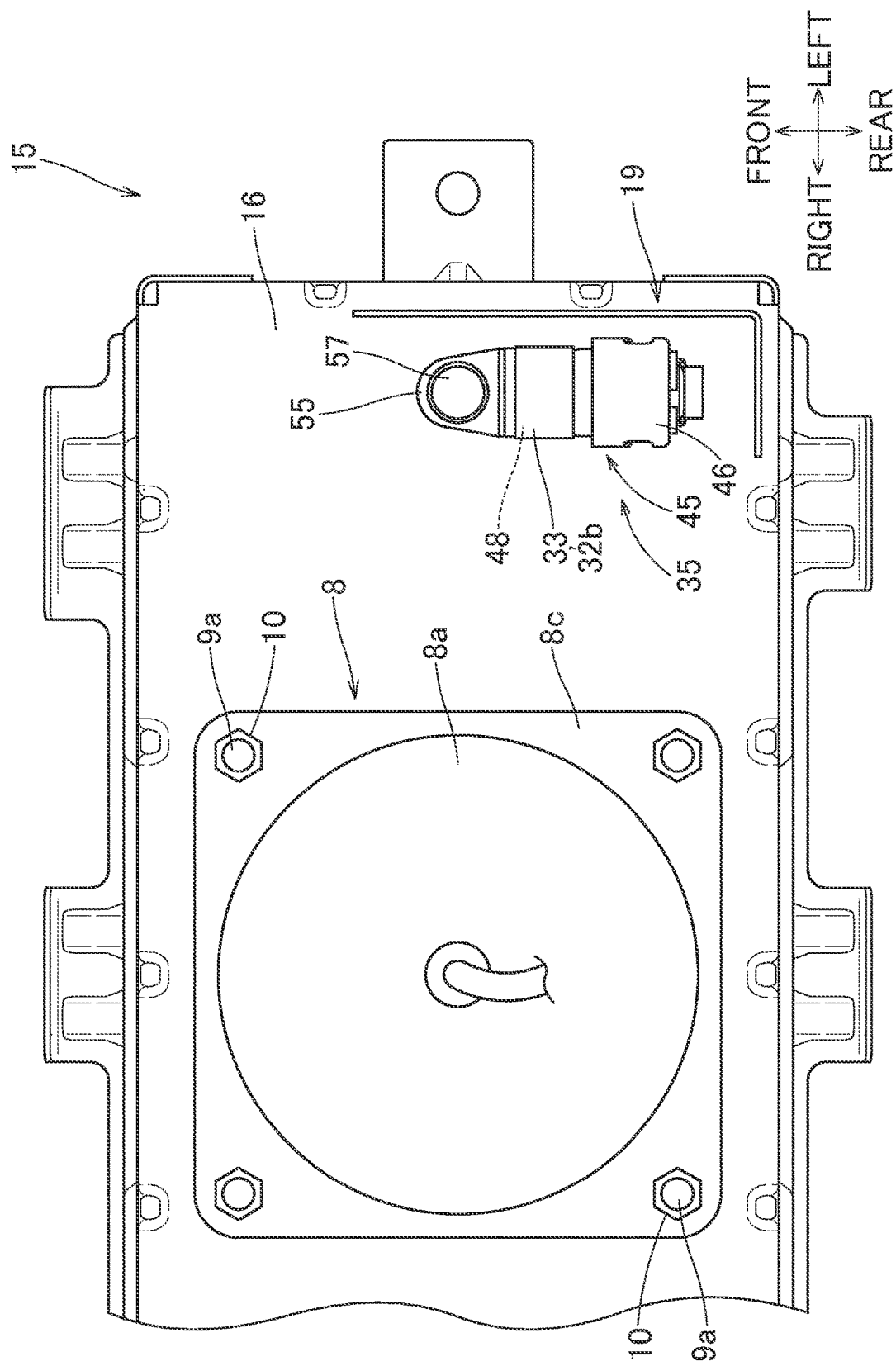
FIG. 3 is a partially enlarged bottom view showing an inflator and an actuator in the airbag device of FIG. 2.

The case 15 acting as a housing region is made of sheet metal and, as shown in FIGS. 1 to 3, includes a bottom wall portion 16 of an approximately rectangular plate form, to which the inflator 8 is attached by being inserted from below, and a peripheral wall portion 17, which extends upward from an outer peripheral edge of the bottom wall portion 16 and engages with a coupling wall portion 6c of the airbag cover 6. Although omitted from the drawings, an aperture through which the main body portion 8a of the inflator 8 is inserted, and the through holes through which the bolts 9a of the retainer 9 are inserted, are formed in the bottom wall portion 16. In the case of the embodiment, the bolts 9a of the retainer 9 disposed inside the airbag 25 are as an attachment member, the airbag 25 and the inflator 8 are attached to the bottom wall portion 16 of the case 15 by the bolts 9a being inserted through attachment holes 27 provided in a peripheral edge of an inflow aperture 26 in the airbag 25, the bottom wall portion 16 of the case 15, and the flange portion 8c of the inflator 8, and fastened with nuts 10.

Figure 4:
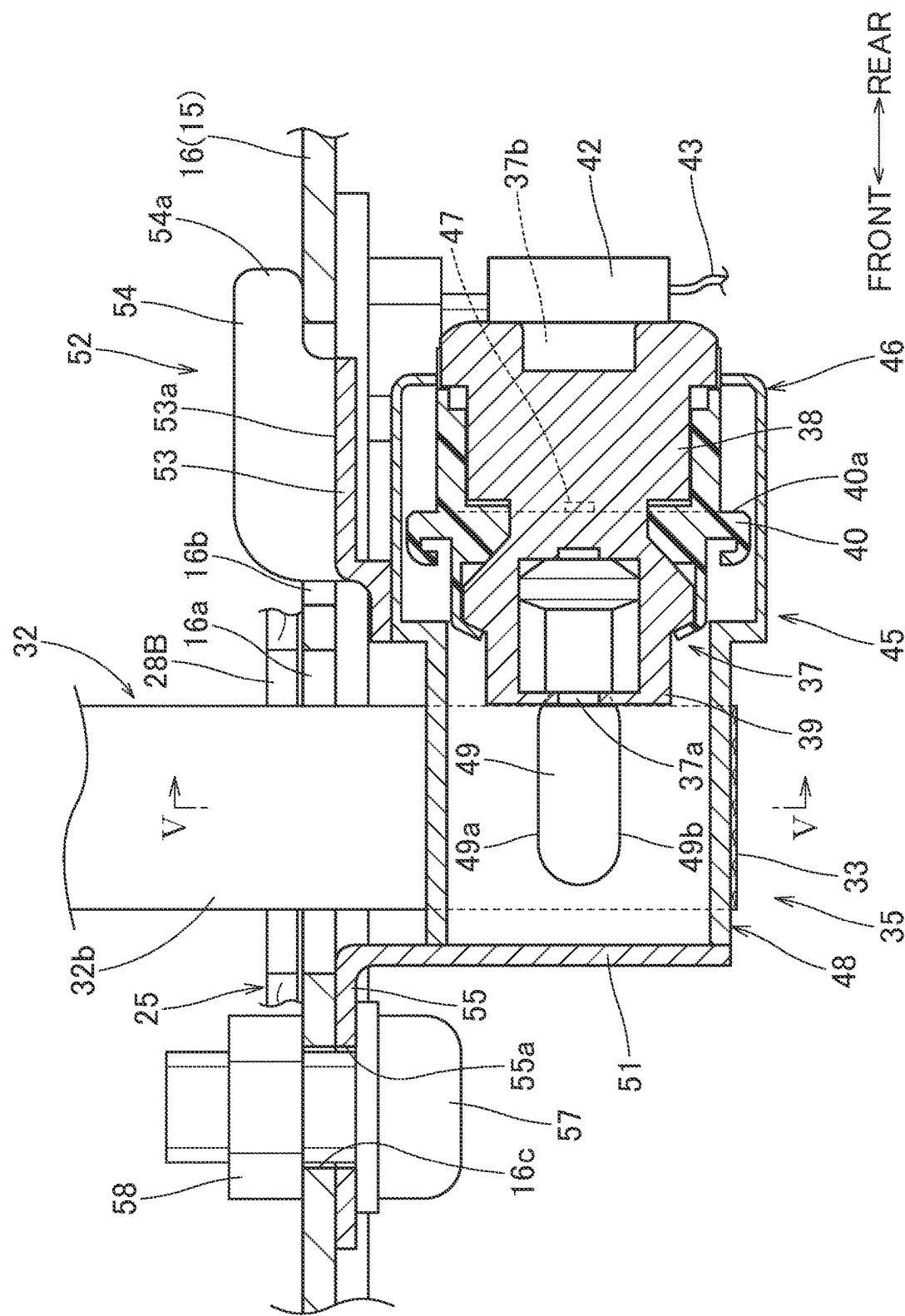
FIG. 4 is a vertical sectional view of a region of the actuator in the airbag device of FIG. 2.
Figure 6:
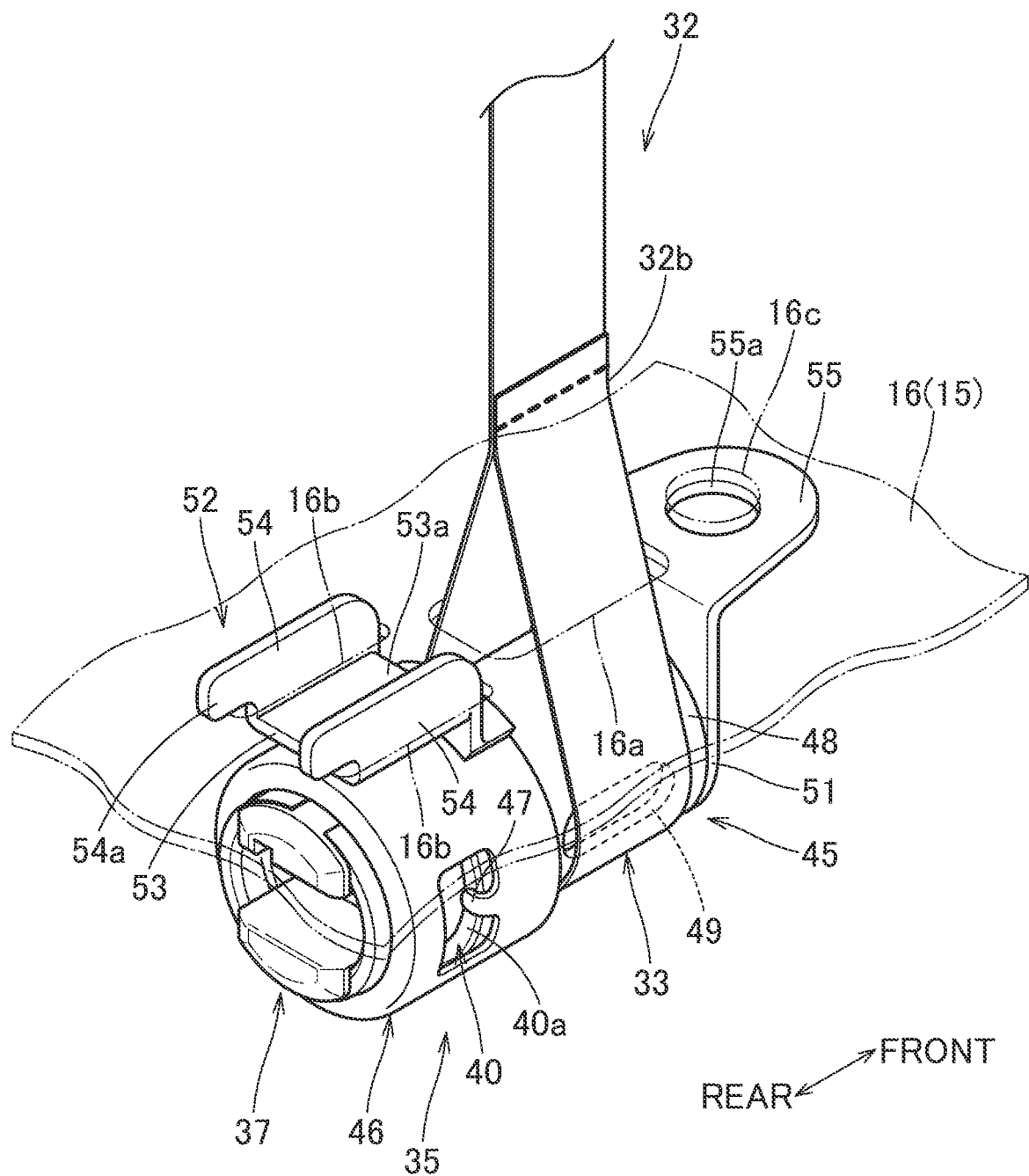
FIG. 6 is a schematic perspective view of the actuator of FIG. 4.

Also, an insertion hole 16a through which a coupling belt 32 acting as a coupling member, to be described hereafter, extending from the airbag 25 is inserted, engagement holes 16b for causing engagement claw portions 54 extending from a holder portion 45, to be described hereafter, of the actuator 35 to be engaged with a peripheral edge, and an attachment hole 16c for attaching the holder portion 45 are formed in a region to the left of the aperture through which the main body portion 8a of the inflator 8 is inserted in the bottom wall portion 16, as indicated in FIG. 4 and indicated by two-dot chain lines in FIG. 6. The insertion hole 16a opens in an approximately rectangular form in order that a coupling belt 32 can be inserted therethrough. Two engagement holes 16b are provided juxtaposed on left and right direction sides corresponding to the engagement claw portions 54, and each is configured in a slit form in an approximately front-rear direction in order that the engagement claw portion 54 can be inserted therethrough. The attachment hole 16c is opened in a circular form in order that a bolt 57 for attaching an attachment piece portion 55, to be described hereafter, formed in the holder portion 45 can be inserted therethrough. In the case of the embodiment, the insertion hole 16a is formed in a position that is on a left end side of the bottom wall portion 16, and slightly rearward of a front-rear center (refer to FIG. 2). The engagement hole 16b are formed on a rear side of the insertion hole 16a, and the attachment hole 16c is formed on a front side of the insertion hole 16a (refer to FIGS. 4 and 6).

Furthermore, a cover wall 19 is disposed in a position on an outer side of the case 15 in a periphery of the actuator 35 on a lower face side of the bottom wall portion 16 (refer to FIG. 2). The cover wall 19 is disposed to extend downward from the bottom wall portion 16. The cover wall 19 is disposed in such a way as to widely cover a side of the actuator 35 in order that a flame, a spark, or the like generated when the gas generator 37 operates cannot be seen through a gap or the like in the instrument panel 1. In the case of the embodiment, the cover wall 19 is disposed in an approximate L-form as seen from below in order to cover the actuator 35 from the left to the rear (the passenger seat PS side) (refer to FIG. 3). Specifically, an up-down direction side width dimension of the cover wall 19 is set to extend to below the actuator 35 in order to be able to widely cover the actuator 35 over a whole up-down region.

As shown in FIGS. 1 and 2, the airbag cover 6 is formed to be integrated with the instrument panel 1, which is made of a synthetic resin, and is configured in such a way that two door portions 6a and 6b, one each front and rear, are opened by being pressed by the airbag 25 when the airbag 25 becomes inflated. Also, the coupling wall portion 6c coupled to the case 15 is formed in a periphery of the door portions 6a and 6b in the airbag cover 6.

Figure 7:
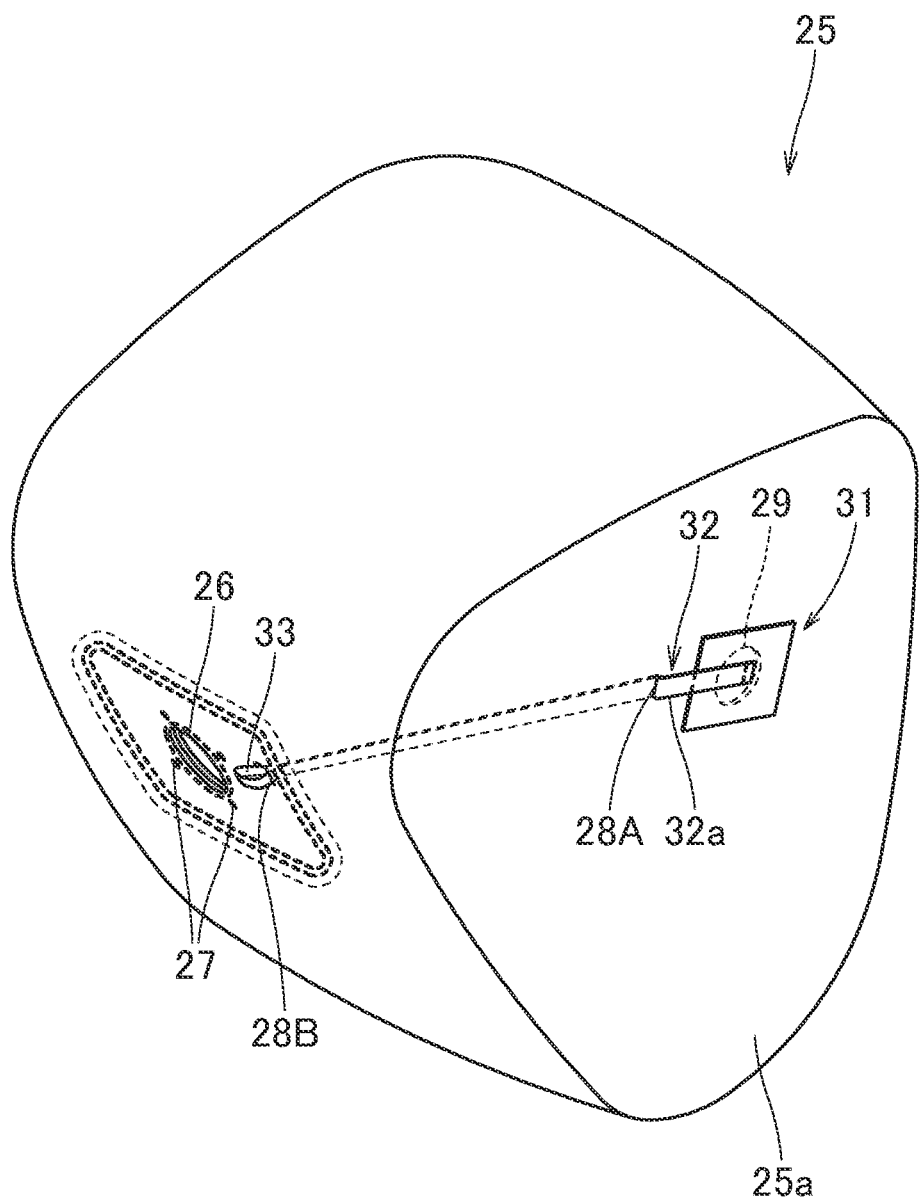
FIG. 7 is a perspective view showing an airbag used in the airbag device of the embodiment in a state individually inflated.

The airbag 25 is of a bag form configured of a woven fabric having flexibility made of a polyimide-based material, a polyester-based material, or the like. As indicated by a two-dot chain line in FIG. 1, the airbag 25 inflates in such a way as to widely cover a region in front of the occupant MP seated in the passenger seat PS owing to an inflating gas being caused to flow into an interior. Specifically, the airbag 25 is disposed in such a way as to fill a space between the upper face 2 of the instrument panel 1 and a windshield 4 above the instrument panel 1 when inflation is completed. As shown in FIG. 7, an external form of the airbag 25 when inflation is completed is an approximate triangular prism form that approximately follows an axial direction in a left-right direction. As shown in FIG. 7, the airbag 25 has the inflow aperture 26 for causing the inflating gas IG to flow into the interior on a front end side when inflation is completed. The inflow aperture 26 is for inserting the main body portion 8a of the inflator 8 from below, and the attachment holes 27 through which the bolts 9a of the retainer 9 are inserted are formed in the peripheral edge of the inflow aperture 26. Also, an exhaust hole 29 opened in a circular form is formed in a left wall portion 25a disposed on the left side when inflation is completed in the airbag 25. Insertion holes 28A and 28B through which the coupling belt 32 acting as a coupling member can be inserted are formed in two places, those being a vicinity of a front edge of the exhaust hole 29 and a vicinity of a left edge of the inflow aperture 26, between the exhaust hole 29 and the inflow aperture 26. Each of the insertion holes 28A and 28B is formed in a slit form in an approximately up-down direction in order that the coupling belt 32 can be inserted therethrough.

As shown in FIGS. 7 and 8, a flap 31 is disposed in such a way as to block the exhaust hole 29 on an outer peripheral side of the airbag 25. The flap 31 is formed of a woven fabric having flexibility made of a polyester-based material, a polyimide-based material, or the like, in the same way as the airbag 25, and an external form thereof is an approximately rectangular form that can block the exhaust hole 29. The flap 31 is such that one side (a rear side), which is a side distanced from the inflow aperture 26, is joined to a rear edge side of the exhaust hole 29, and a base portion 32a of the coupling belt 32 acting as a coupling member coupled to the actuator 35 is coupled to a side (a front side) on the inflow aperture 26 side opposing the rear side.

The coupling belt 32 acting as a coupling member is configured of a string-form body (a belt-form body in the case of the embodiment) having flexibility, and is formed of a material that can be severed by contact with a combustion gas BG when the actuator 35 operates. Specifically, in the case of the embodiment, the coupling belt 32 is formed by a nylon-based material, a PET-based material, or the like, which can be melted by the combustion gas BG, being woven. A leading end 32b side of the coupling belt 32 is wound around a holding wall portion 48 of the holder portion 45, to be described hereafter, in the actuator 35, thereby being held by the holding wall portion 48. In the case of the embodiment, the leading end 32b side of the coupling belt 32 is configured in a loop form, in such a way that the cylindrical holding wall portion 48 can be inserted, by an end edge 32c being sewn to an intermediate region. Specifically, a loop portion 33 on the leading end 32b side of the coupling belt 32 is set to be of a size such that the holding wall portion 48 can be inserted, and also, a size such that the attachment piece portion 55, to be described hereafter, in the holder portion 45, which is disposed in such a way as to protrude considerably from the holding wall portion 48, can also be inserted through the loop portion 33. Also, a length dimension of the coupling belt 32 is set to be a dimension such that the airbag 25 can be inflated without hindrance even in a state wherein a coupled state of the loop portion 33 on the leading end 32b side and the actuator 35 is maintained, and also, closing of the exhaust hole 29 by the flap 31 can be stably maintained when the coupling is maintained. Furthermore, in the embodiment, a width dimension of the coupling belt 32 is a dimension slightly smaller than a length dimension of the holding wall portion 48 of the holder portion 45, and is set to be approximately equal to a length dimension of a gas outflow hole 49 formed in the holding wall portion 48 (refer to FIGS. 4 and 6).

Further, in the embodiment, the airbag 25 is folded in a state wherein an outer peripheral side of the exhaust hole 29 is covered by the flap 31, and housed in the case 15. At this time, the coupling belt 32 is folded together with the airbag 25 in a state inserted through the insertion holes 28A and 28B formed in the airbag 25 in such a way that the base portion 32a side and the leading end 32b side are disposed on the outer peripheral side of the airbag 25, and the intermediate region is disposed on an inner peripheral side of the airbag 25. When mounted in a vehicle, as will be described hereafter, the leading end 32b of the coupling belt 32 is protruded from the insertion hole 16a of the case 15, and coupled to the actuator 35 by the holding wall portion 48 of the holder portion 45 in the actuator 35 being inserted through the loop portion 33.

Figure 8A:
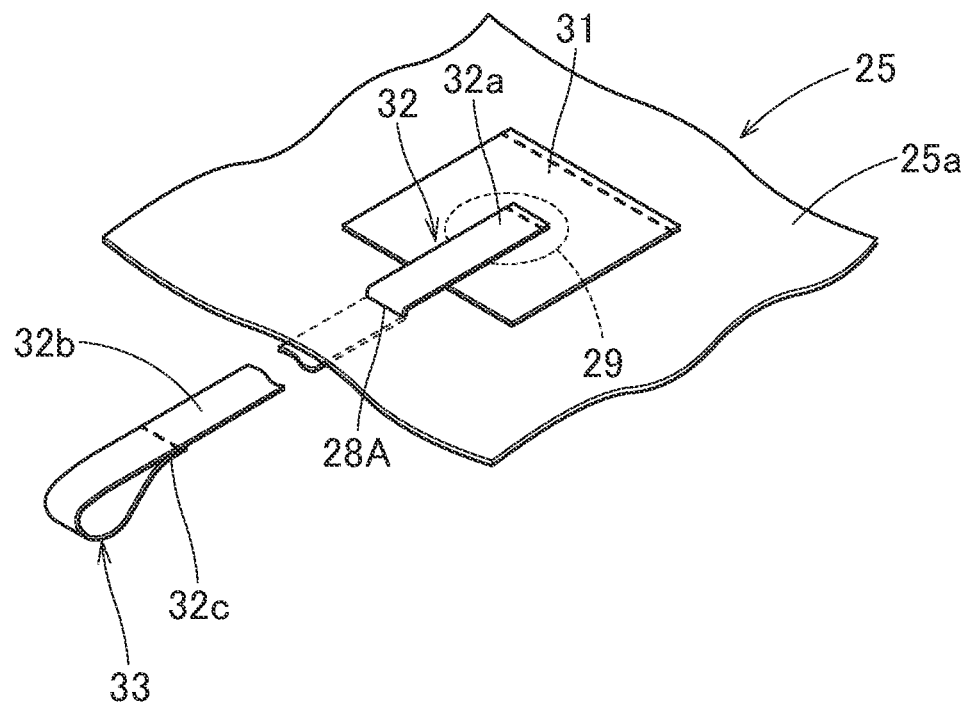
Figure 8B:
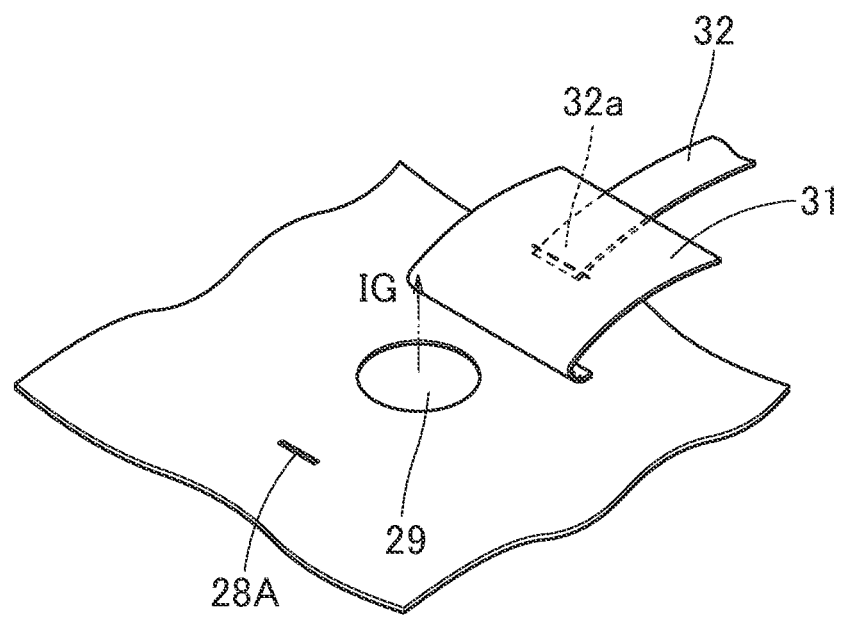
Figure 9A:
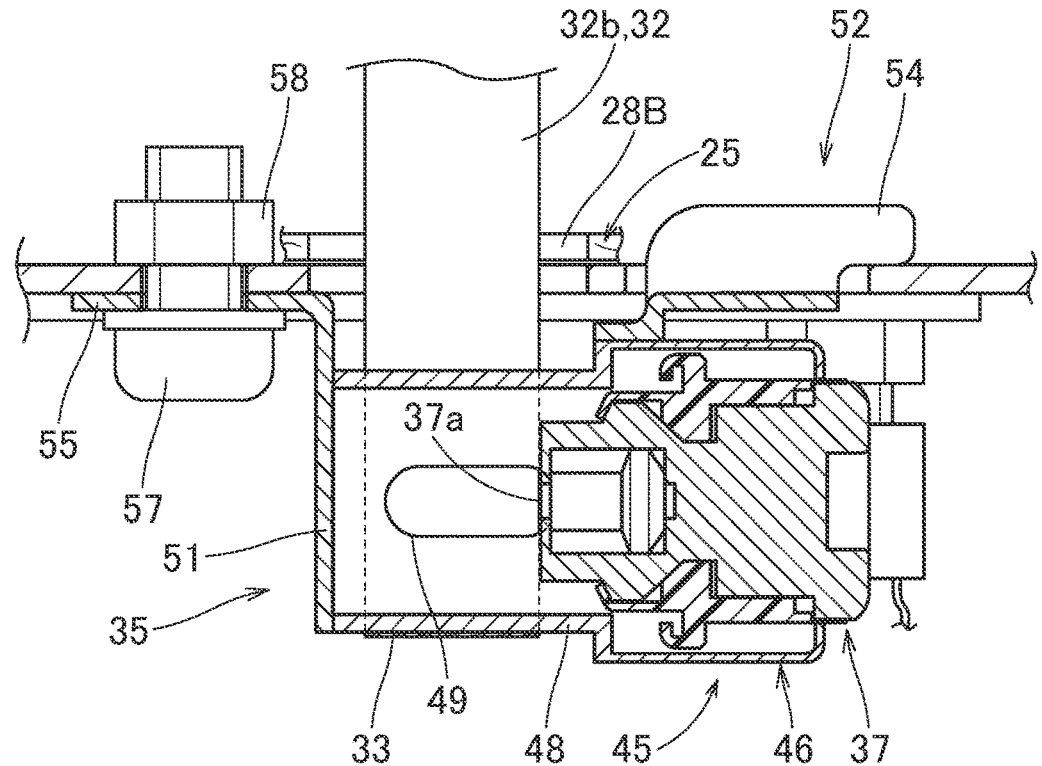
Figure 9B:
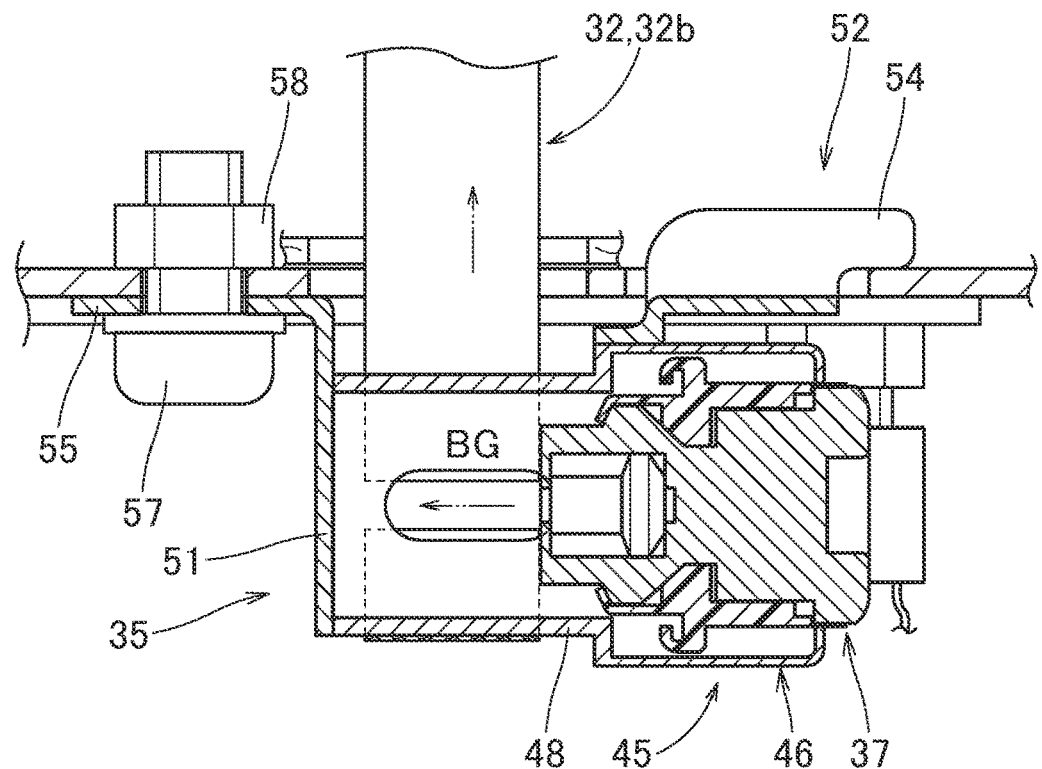
Figure 10A:
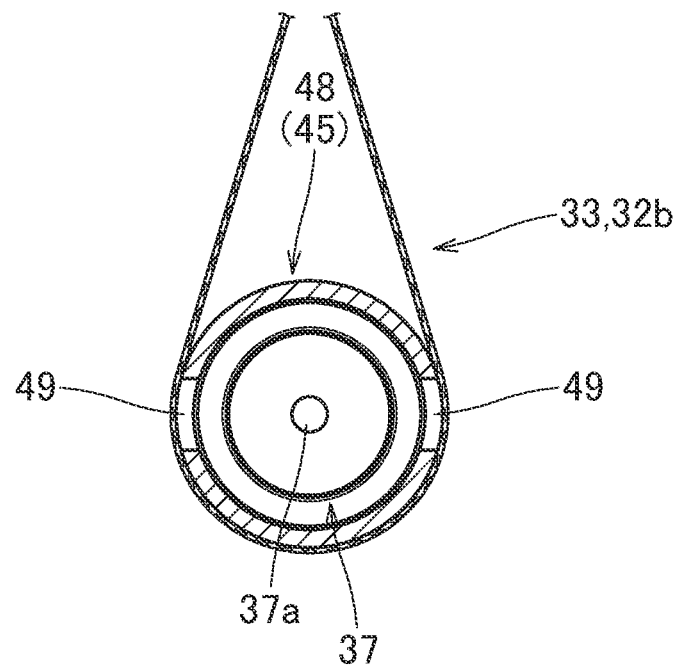
Figure 10B:
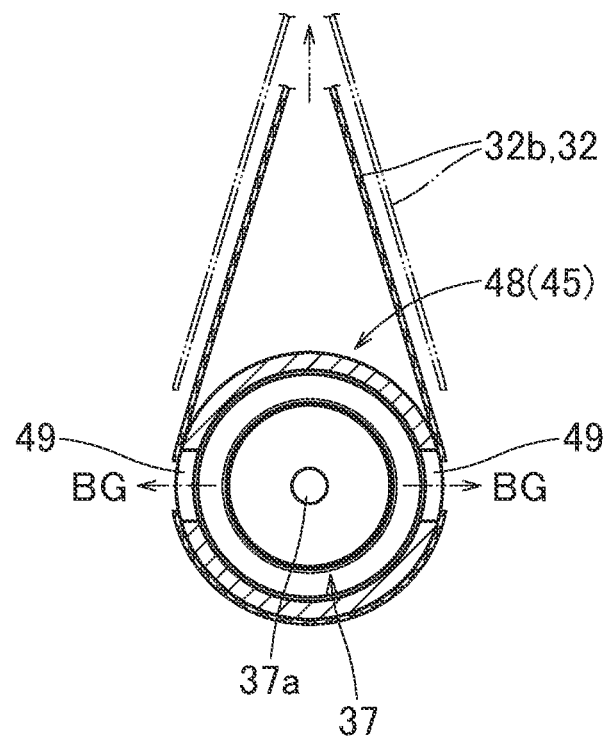

Further, in the embodiment, the airbag 25 inflates in two inflation modes (two inflation aspects), those being an opened mode, wherein the exhaust hole 29 is opened, and a closed mode, wherein a closed state of the exhaust hole 29 is maintained. Specifically, in a state wherein the actuator 35 does not operate, and a coupling of the loop portion 33 of the leading end 32b of the coupling belt 32 and the actuator 35 (specifically, the holding wall portion 48 of the holder portion 45) is maintained (refer to FIGS. 9A and 10A), a leading end side of the flap 31 is held down by the base portion 32a of the coupling belt 32, and the airbag 25 inflates in the closed mode wherein the flap 31 closes the exhaust hole 29, as shown in FIG. 8A. In a state wherein the actuator 35 operates, the loop portion 33 of the leading end 32b of the coupling belt 32 is severed by coming into contact with the combustion gas BG, a coupling of the leading end 32b of the coupling belt 32 and the actuator 35 is terminated (refer to FIGS. 9B and 10B), the flap 31 is pressed by the inflating gas IG attempting to flow out from the exhaust hole 29, the flap 31 opens, and the airbag 25 inflates in the opened mode wherein the exhaust hole 29 is opened, as shown in FIG. 8B. The airbag 25 is completely inflated in such that internal pressure is maintained in the closed mode. And, the airbag 25 is completely inflated in a state wherein a rise in internal pressure is restricted in the opened mode. An operation of the actuator 35 (specifically, the gas generator 37 to be described hereafter) is controlled by the control device 60. In the case of the embodiment, the control device 60, when detecting an excessive proximity of the occupant MP to the instrument panel 1 based on a signal from the position detecting sensor 62, or when detecting that the physique of the occupant MP is small based on a signal from the weight detecting sensor 63, causes the gas generator 37 in the actuator 35 to operate simultaneously with, or slightly later than, an operation of the inflator 8, in such a way as to reduce the internal pressure of the airbag 25 when inflating.

Figure 5:
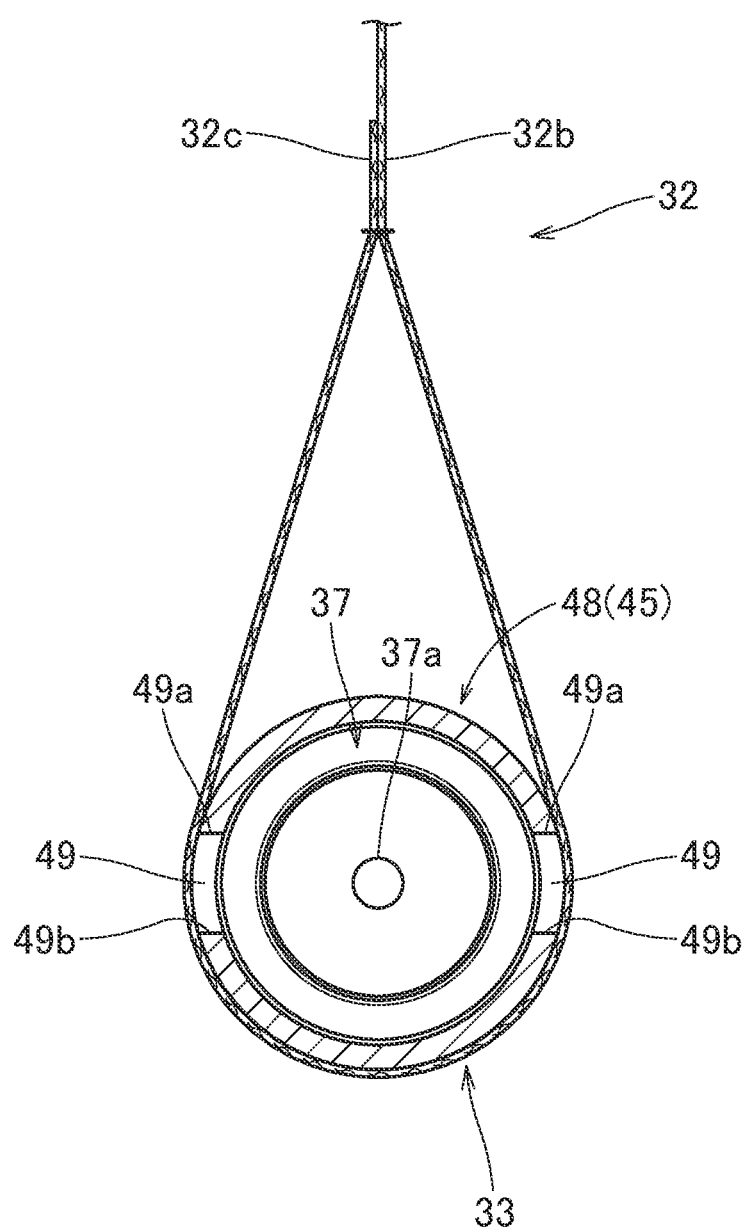
FIG. 5 is a sectional view of a V-V region in FIG. 4.

In the case of the embodiment, the actuator 35 is disposed in a region to the left of the inflator 8, as shown in FIG. 3. As shown in FIGS. 4 and 5, the actuator 35 includes the gas generator 37 and the holder portion 45, which holds the gas generator 37 and which can hold the coupling belt 32 acting as a coupling member by the coupling belt 32 being wound around the holder portion 45.

The gas generator 37 is electrically connected to the control device 60, and is configured in such a way as to operate when an operation signal from the control device 60 is input, and cause the combustion gas BG to be generated. Specifically, a squib, a micro gas generator, or the like that, when operating, causes an unshown predetermined amount of an explosive to ignite, thereby causing the combustion gas BG to be generated by combustion of the explosive itself or by combustion of a gas generating agent ignited by the explosive, is used as the gas generator 37. The gas generator 37 is housed and held in a gas generator housing portion 46, to be described hereafter, in the holder portion 45, and includes a main body that causes the combustion gas BG to be generated and a holder that holds the main body, and an external form is approximately cylindrical. Specifically, as shown in FIG. 4, the gas generator 37 includes a cylindrical main body portion 38, a head portion 39 disposed on a leading end side (a front end side when mounted in a vehicle) of the main body portion 38, and a flange portion 40 disposed between the head portion 39 and the main body portion 38. The head portion 39 is set of a diameter smaller than that of the cylindrical main body portion 38. The flange portion 40 is protruded over a whole area in an axial rotation direction of the main body portion 38. Also, the gas generator 37 is such that an ejection port 37a that causes the combustion gas BG to be ejected is disposed in a leading end face (a front end face) of the head portion 39, and a terminal 37b is disposed in a base portion end side (a rear end side) of the main body portion 38. The gas generator 37 is housed in the gas generator housing portion 46 in the holder portion 45 with the terminal 37b exposed, and is electrically connected to the control device 60 by a connector 42 that causes a lead 43 extending from the control device 60 to be connected being connected to the terminal 37b. When operating, the gas generator 37 is ignited by an operation signal from the control device 60 being input, and causes an unshown explosive or gas generating agent to combust, thereby causing the combustion gas BG to be ejected from the ejection port 37a.

The holder portion 45 is made from sheet metal, and includes the gas generator housing portion 46 in which the gas generator 37 is housed and held, the holding wall portion 48 that can hold the coupling belt 32, a top wall portion 51 that closes a leading end side of the holding wall portion 48, an engagement portion 52 for causing the holder portion 45 to be engaged with the case 15 side, and the attachment portion 55 that attaches the holder portion 45 to the case 15 side.

The gas generator housing portion 46 is of an approximately cylindrical form wherein both end sides are opened in order to be able to cover a periphery of the gas generator 37 and hold the gas generator 37. A supporting projection 47 that can support a rear face 40a side of the flange portion 40 in the gas generator 37 is disposed in the gas generator housing portion 46 by being cut and raised on an inner peripheral face side while cutting away a periphery (refer to FIGS. 4 and 6). The supporting projection 47 is for restricting a withdrawing movement of the gas generator 37 when operating, and in the case of the embodiment, is formed in two places (both left and right sides) to have symmetry centered on a central axis of the holder portion 45.

The engagement portion 52 for causing the holder portion 45 to be engaged with the case 15 side is formed in such a way as to extend from the gas generator housing portion 46 above the gas generator housing portion 46, which is one end side (a rear end side) of the holder portion 45. The engagement portion 52 includes an abutment seat portion 53 of a flat plate form disposed in such a way as to approximately follow the bottom wall portion 16 of the case 15, and two engagement claw portions 54 formed in such a way as to protrude upward from both left and right edge sides of the abutment seat portion 53 (refer to FIG. 6). The abutment seat portion 53 is configured in such a way as to be able to come into contact with the lower face side of the bottom wall portion 16. Each engagement claw portion 54 is formed approximately following the front-rear direction in such a way that a leading end extends toward the rear while the engagement claw portion 54 protrudes upward from both the left and right edge sides of the abutment seat portion 53. Each engagement claw portion 54 is inserted into the engagement hole 16b formed in the bottom wall portion 16 of the case 15, and a leading end 54a side is engaged with a peripheral edge of the engagement hole 16b (refer to FIG. 4). In the engagement portion 52, the engagement claw portion 54 engaged with the peripheral edge of the engagement hole 16b restricts a downward movement of the holder portion 45 with respect to the bottom wall portion 16, and the abutment seat portion 53 restricts an upward movement of the holder portion 45 by being brought into contact with the lower face side of the bottom wall portion 16.

The holding wall portion 48 is configured in such a way as to be able to hold the coupling belt 32 on an outer peripheral face side by the coupling belt 32 being wound around the holding wall portion 48. In the case of the embodiment, the holding wall portion 48 is of an approximately cylindrical form configured in such a way that a central axis approximately coincides with a central axis of the gas generator housing portion 46, and is formed in such a way as to be continuous with the gas generator housing portion 46. Specifically, the holding wall portion 48 is of an approximately cylindrical form having a diameter smaller than that of the gas generator housing portion 46. That is, the holding wall portion 48 is formed in an approximately tubular form centered on a direction of ejection of the combustion gas BG ejected from the ejection port 37a of the gas generator 37. Also, the leading end side of the holding wall portion 48 apart from the gas generator housing portion 46 is closed by the top wall portion 51. The gas outflow hole 49, through which the combustion gas BG can flow out toward the loop portion 33 of the coupling belt 32 disposed in such a way as to cover the outer peripheral side, is formed penetrating the holding wall portion 48. The gas outflow hole 49 configures a contact region in which the combustion gas BG generated when the gas generator 37 operates can come into contact with the loop portion 33 of the coupling belt 32 wound around the outer peripheral face side. In the case of the embodiment, the gas outflow hole 49 is formed in a long hole form in two places in an approximate up-down center of the holding wall portion 48, opposing on left and right direction sides (either side in directions perpendicular to the axis) forming a left side and a right side of the central axis of the holding wall portion 48, when mounted in a vehicle, with a longitudinal direction of each approximately following the front-rear direction (the axial direction of the holding wall portion 48) (refer to FIGS. 4 to 6). That is, the two gas outflow holes 49 are formed in a region whose outer peripheral side is covered by the loop portion 33, or in other words, the two gas outflow holes 49 are formed in a region wherein both edges on a circumferential direction side (an upper edge 49a and a lower edge 49b) are brought into contact with the loop portion 33 (the coupling belt 32) in a cross-section of a side perpendicular to the axis of the holding wall portion 48 when mounted in a vehicle, as shown in FIG. 5. In the case of the embodiment, a length dimension of the gas outflow hole 49 (a width dimension on the axial direction side of the holding wall portion 48) is set to be approximately the same as the width dimension of the coupling belt 32, which is set to be a dimension slightly smaller than the length dimension of the holding wall portion 48.

The attachment piece portion 55 that attaches the holder portion 45 to the case 15 side attaches an other end side (a front end side) of the holder portion 45 to the case 15, and is formed in such a way as to extend forward in such a way as to follow the bottom wall portion 16 of the case 15, while protruding upward in such a way as to be continuous with the top wall portion 51 The attachment piece portion 55 has an attachment hole 55*a*, through which the bolt 57 can be inserted, corresponding to the attachment hole 16*c* formed in the bottom wall portion 16. As shown in FIG. 4, the attachment piece portion 55 is attached to the bottom wall portion 16 using the bolt 57 and a nut 58. That is, the actuator 35 of the embodiment is of a configuration wherein both axial direction end sides are attached to the case 15 side using the engagement portion 52 disposed on the gas generator housing portion 46 side and the attachment piece portion 55 formed on the leading end side (the top wall portion 51 side) of the holding wall portion 48. Also, the engagement portion 52 and the attachment piece portion 55 also include a function of stoppers that restrict a detachment of the loop portion 33 of the coupling belt 32 in a state wound around the holding wall portion 48 from the holding wall portion 48.

Next, a mounting of the airbag device M of the embodiment in a vehicle will be described. Firstly, in a state wherein the retainer 9 is disposed in the interior, the airbag 25 is folded in such a way as to be able to be housed in the case 15, while maintaining a state of the exhaust hole 29 being closed by the flap 31, and maintaining a state wherein the loop portion 33 on the leading end 32*b* side is caused to protrude from the insertion hole 28B by the coupling belt 32 being inserted into the insertion holes 28A and 28B. Subsequently, the folded airbag 25 is housed in the case 15. At this time, the loop portion 33 on the leading end 32*b* side of the coupling belt 32 is caused to protrude from the insertion hole 16*a* of the bottom wall portion 16. The actuator 35 in a state wherein the gas generator 37 is held in the holder portion 45 is such that the engagement claw portion 54 in the engagement portion 52 is inserted into the engagement hole 16*b* from below the bottom wall portion 16, simultaneously with which the holding wall portion 48 is inserted into the loop portion 33. Further, by the attachment piece portion 55 being attached to the bottom wall portion 16 using the bolt 57 and the nut 58, the actuator 35 can be attached to the case 15, simultaneously with which the actuator 35 and the coupling belt 32 can be coupled. Next, the main body portion 8*a* of the inflator 8 is inserted from below, and the inflator 8 and the airbag 25 are attached to the case 15 using the bolt 9*a* of the retainer 9 protruding from the bottom wall portion 16 and the nut 10. Subsequently, the peripheral wall portion 17 of the case 15 is engaged with the coupling wall portion 6*c* of the airbag cover 6 in the instrument panel 1 mounted in the vehicle V, and an unshown bracket provided in the case 15 is fixed to a body side of the vehicle V. Next, the connector 42 that causes the lead 43 extending from the control device 60 to be connected is connected to the gas generator 37 of the actuator 35, and by an unshown lead extending from the control device 60 being connected to the inflator 8, the airbag device M can be mounted in the vehicle V.

Further, the airbag device M of the embodiment is such that by the inflating gas IG being discharged from the gas discharge port 8*b* of the inflator 8, the airbag 25 inflates owing to the inflating gas being caused to flow into the interior, and pushes open the door portions 6*a* and 6*b* of the airbag cover 6. Further, the airbag 25 protrudes upward from the case 15 via an aperture formed by the door portions 6*a* and 6*b* of the airbag cover 6 being pushed open, and inflates further while protruding toward the rear side of the vehicle V. Further, the airbag 25 completes expansion in such a way as to close a space between the upper face 2 of the instrument panel 1 and the windshield 4 above the instrument panel 1, as indicated by a two-dot chain line of FIG. 1

In the airbag device M of the embodiment, the coupling belt 32 acting as a coupling member extending from the airbag 25 is of a configuration wherein a state of coupling with the actuator 35 is maintained by the coupling belt 32 being held by being wound around the holding wall portion 48 of the holder portion 45 in the actuator 35. Also, in the airbag device M of the embodiment, the gas generator 37 of the actuator 35 causes the combustion gas BG to be ejected when operating, and by the combustion gas BG being brought into contact with the loop portion 33 of the coupling belt 32 in a contact region (the gas ejection hole 49 in the embodiment) provided in the holder portion 45, the coupling belt 32 is severed by being burned apart or melted, and the state of coupling with the holder portion 45 is terminated (refer to FIGS. 9 and 10B). That is, in the airbag device M of the embodiment, an operating pin or the like used in an actuator of an existing airbag device is unneeded, and a state of coupling between the coupling belt 32 and the holder portion 45 can be terminated simply by the combustion gas BG ejected from the gas generator 37 being brought into contact with the coupling belt 32 held in the holder portion 45, because of which a configuration can be simplified in comparison with that of the existing airbag device. Also, the airbag device M of the embodiment is of a configuration wherein the coupling belt 32 is severed by the combustion gas BG being brought into contact with the coupling belt 32 in a contact region (the gas ejection hole 49) provided in the holder portion 45, because of which a state of coupling between the coupling belt 32 and the holder portion 45 can be stably terminated.

Consequently, the airbag device M of the embodiment is such that a configuration is simple, and a state of coupling with the coupling belt 32 can be smoothly terminated when the actuator 35 operates.

Specifically, in the airbag device M of the embodiment, the holding wall portion 48 of the holder portion 45 is formed in an approximately tubular form centered on the direction of ejection of the combustion gas BG, and in the holding wall portion 48, the gas outflow hole 49 that can cause the combustion gas BG to flow out toward the loop portion 33 of the coupling belt 32 disposed in such a way as to cover the outer peripheral side is disposed penetrating, and a contact region is configured by the gas outflow hole 49. That is, in the airbag device M of the embodiment, an end portion (the leading end 32*b*) side of the coupling belt 32 is of a loop form, the coupling belt 32 can be caused to be held in the holder portion 45 by the holding wall portion 48 of the holder portion 45 being inserted through the loop portion 33 on the leading end 32*b* side. Therefore, holding operation of causing the coupling belt 32 to be held in the holder portion 45 is easy.

Also, in the airbag device M of the embodiment, the holding wall portion 48 is of a cylindrical form, and the gas outflow hole 49 is formed in positions in the approximate up-down center of the holding wall portion 48, opposing on the left and right direction sides forming the left side and the right side of the central axis, when mounted in a vehicle. That is, the gas outflow hole 49 is configured in such a way that the outer peripheral side is covered by the loop portion 33 of the coupling belt 32 when mounted in a vehicle. In yet other words, the gas outflow hole 49 is configured disposed in a region wherein both edges on the circumferential direction side (the upper edge 49*a* and the lower edge 49*b*) are brought into contact with the loop portion 33 of the coupling belt 32 in a cross-section of a side perpendicular to the axis of the holding wall portion 48 when mounted in a vehicle (refer to FIG. 5). Because of this, the combustion gas BG can swiftly be caused to flow out toward the loop portion 33 of the coupling belt 32 via the gas outflow hole 49, and the coupling belt 32 can swiftly be severed in a region of the loop portion 33. When such a point is not taken into consideration, a configuration may be such that a gas outflow hole is disposed in a position deviating slightly from a position wherein the gas outflow hole is brought into contact with a loop portion (in the case of the embodiment, a position that is slightly upward).

In the embodiment, the gas outflow hole 49 is disposed in two places, those being on both the left and right sides in the approximate up-down center of the holding wall portion 48. However, disposition positions and a disposed quantity of a gas outflow hole are not limited to those in the embodiment. For example, a configuration wherein the gas outflow hole 49 is disposed in only one position on a lower end side of a holding wall portion may be adopted. Also, in the embodiment, the external form of the gas outflow hole 49 is a long hole form whose length dimension is approximately the same as the width dimension of the coupling belt 32, but an external form of a gas outflow hole is not limited to that in the embodiment either. A configuration wherein a large number of holes of a small diameter are disposed as gas outflow holes may be adopted. Furthermore, in the embodiment, the holding wall portion 48 is of a cylindrical form, but need not be of a cylindrical form provided that the loop portion 33 of the coupling belt 32 can be held. For example, a configuration may be such that a holding wall portion is of a semi-cylindrical form wherein an upper side is cut away, and a leading end side is closed by a top wall portion.

Further still, in the airbag device M of the embodiment, the cover wall 19 covering sides (the left and the rear) of the actuator 35 is disposed in positions on the outer side of the case 15 in the periphery of the actuator 35 (in the case of the embodiment, positions to the left and the rear of the actuator 35) in such a way as to extend from the case 15 side. Because of this, a flame, a spark, or the like generated when the gas generator 37 operates can be rendered invisible through a gap or the like in the instrument panel 1.

Figure 11:
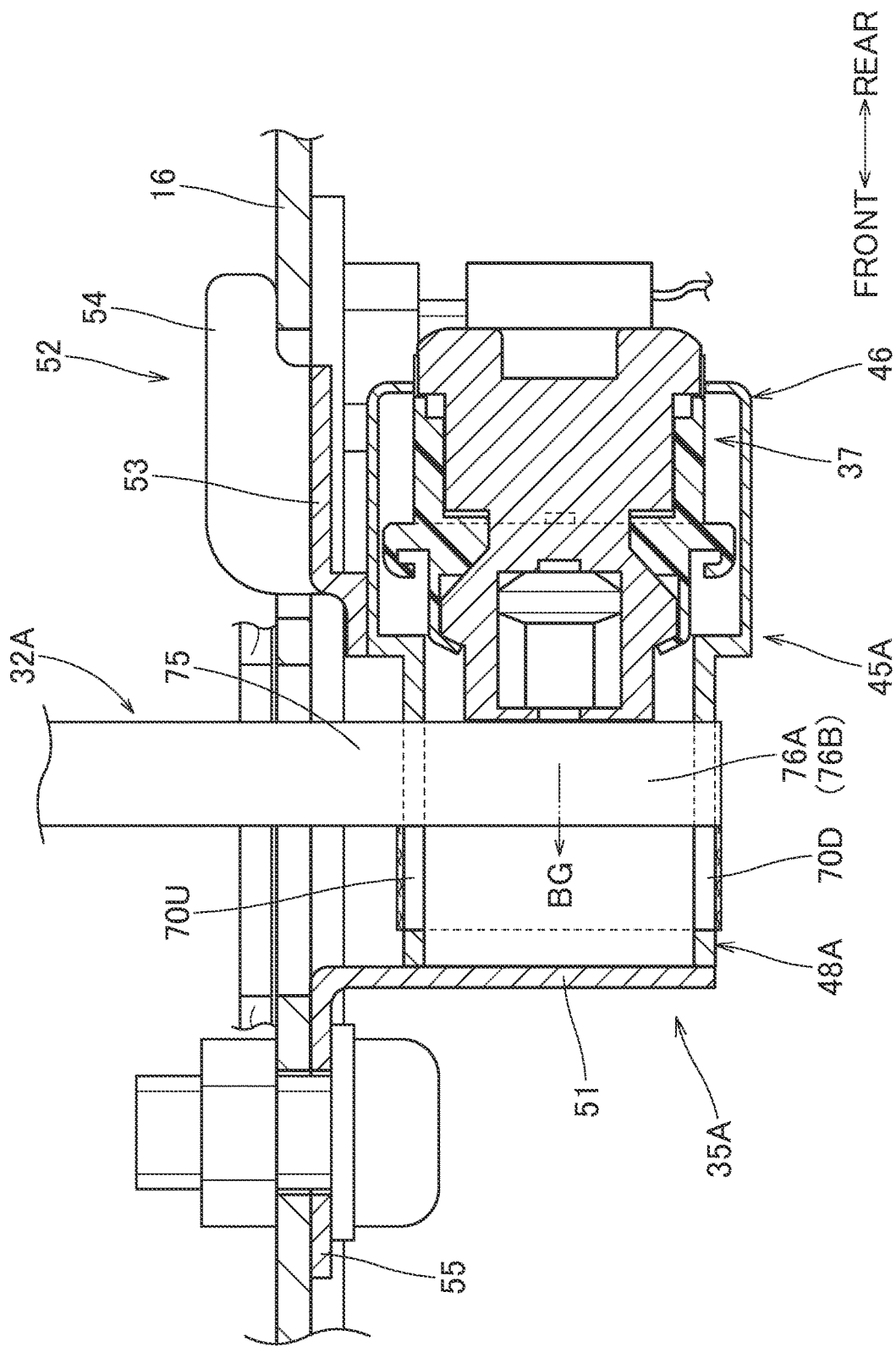
FIG. 11 is a vertical sectional view showing an actuator that is another embodiment.
Figure 12:
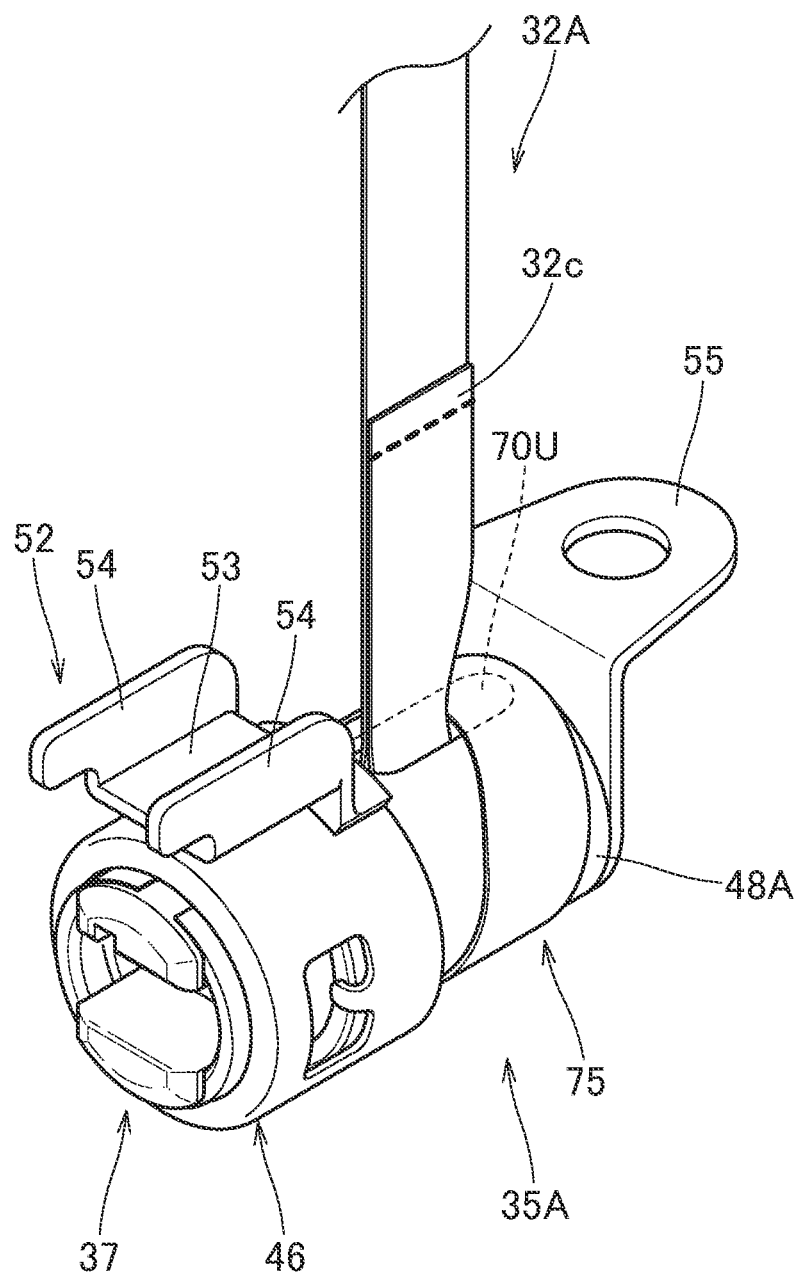
FIG. 12 is a schematic perspective view of the actuator of FIG. 11.
Figure 13A:
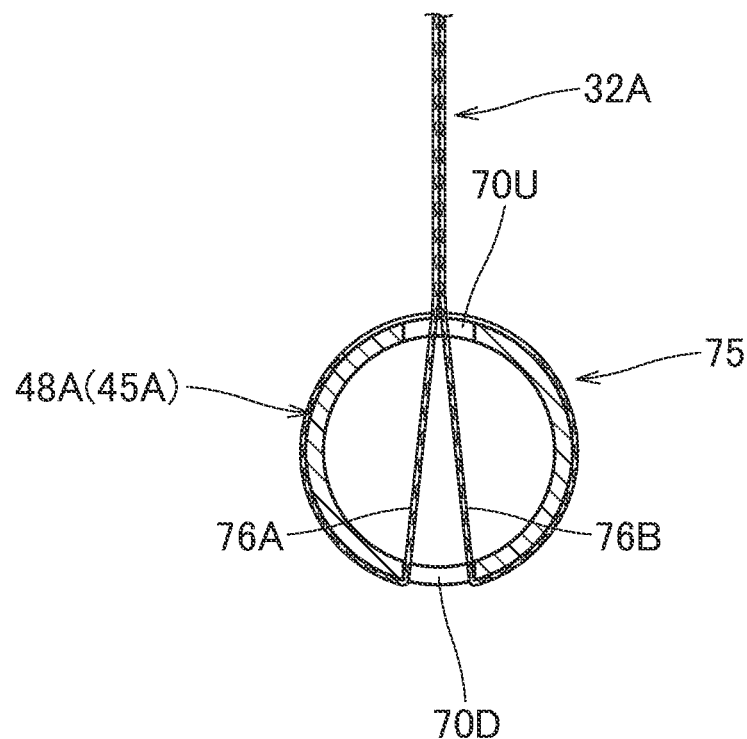

Also, an actuator of a kind of configuration shown in FIGS. 11 and 12 may be used as an actuator 35A. The actuator 35A is of the same configuration as the actuator 35, excepting a holding wall portion 48A in a holder portion 45A. In the same way as the holding wall portion 48 in the actuator 35, the holding wall portion 48A is configured in such a way as to be able to hold a coupling belt 32A on an outer peripheral face side by the coupling belt 32A being wound around the holding wall portion 48A, is of an approximately cylindrical form configured in such a way that a central axis approximately coincides with the central axis of the gas generator housing portion 46, and is formed in such a way as to be continuous with the gas generator housing portion 46. The holding wall portion 48A is also of an approximately cylindrical form having a diameter smaller than that of the gas generator housing portion 46, in the same way as the holding wall portion 48. That is, the holding wall portion 48A is also formed in an approximately tubular form centered on the direction of ejection of the combustion gas BG ejected from the ejection port 37a of the gas generator 37. Insertion holes 70U and 70D through which the coupling belt 32A can be inserted are formed penetrating in two places on up-down direction sides in the holding wall portion 48A. External forms of the insertion holes 70U and 70D are approximately the same, and each is formed in a long hole form wherein a longitudinal direction approximately follows the front-rear direction (an axial direction of the holding wall portion 48A). A length dimension of the insertion holes 70U and 70D (a width dimension on the axial direction side of the holding wall portion 48A) is set to be a dimension slightly smaller than the length dimension of the holding wall portion 48A (refer to FIG. 11). Further, the actuator 35A is such that a width dimension of the coupling belt 32A is set to be smaller than the width dimension of the coupling belt 32, in order that the coupling belt 32A can be inserted through the insertion holes 70U and 70D. In the case of the embodiment, as shown in FIGS. 11, 12, and 13A, the coupling belt 32A is coupled to the holding wall portion 48A, as follows. A leading end side region 75 is inserted downward from the upper side insertion hole 70U into the holding wall portion 48A, caused to protrude from the lower side insertion hole 70D, then wrapped once around the outer peripheral side of the holding wall portion 48A, and again inserted upward from the lower side insertion hole 70D into the holding wall portion 48A, and the end edge 32c protruding from the upper side insertion hole 70U is joined (sewn) to an intermediate region. That is, as shown in FIG. 13A, the coupling belt 32A is held by the holder portion 45A in such that two insertion regions 76A and 76B are inserted into the holding wall portion 48A. In the actuator 35A, an inner peripheral side of the holding wall portion 48A configures a contact region in which the combustion gas BG can be brought into contact with the coupling belt 32A (the insertion regions 76A and 76B).

Figure 13B:
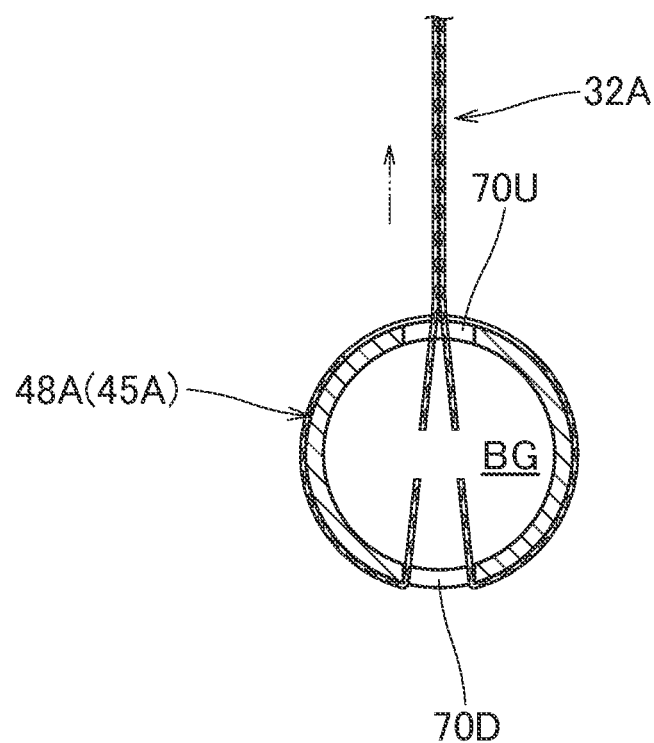

When using the actuator 35A having this kind of configuration, an operation of coupling the coupling belt 32A to the holding wall portion 48A is slightly troublesome in comparison with the actuator 35, which is of a configuration wherein the coupling belt 32 is caused to be held in the holder portion 45 simply by the holding wall portion 48 being inserted into the loop portion 33 formed on the leading end 32b side of the coupling belt 32. However, the combustion gas BG can reliably be brought into contact with the two insertion regions 76A and 76B in the coupling belt 32A on the inner peripheral side of the holding wall portion 48A when the gas generator 37 operates. Further, a state of the coupling belt 32A being held in the holder portion 45A can reliably be terminated by the coupling belt 32A being severed in regions of the two insertion regions 76A and 76B (refer to FIG. 13B). In the embodiment, the leading end side region 75 of the coupling belt 32A is wound around the outer peripheral side of the holding wall portion 48A in such a way as to cover the whole periphery, and the two insertion regions 76A and 76B are inserted into the holding wall portion 48A. A coupling belt may also be of a configuration such that, in order to have one insertion region, a leading end side region is coupled to a holder portion by being wound around only one of left and right sides of a holding wall portion. However, when considering coupling strength when an airbag is caused to be inflated in a state wherein a state of coupling with an actuator is maintained, it is preferable that the coupling belt 32A has two insertion regions 76A and 76B, and is coupled to the actuator 35A by being wound around the outer peripheral side of the holding wall portion 48A in such a way as to cover the whole periphery, as shown in the embodiment.

In the airbag device M of the embodiment, the coupling belts 32 and 32A are coupled to the actuators 35 and 35A by the coupling belts 32 and 32A being wound around the outer peripheral sides of the tubular holding wall portions 48 and 48A in the actuators 35 and 35A. The holding wall portions 48 and 48A can be of a large diameter in comparison with that of an operating pin used in an existing airbag device, therefore, more strength can be secured in comparison with the operating pin heretofore used. Also, termination of a coupling state is carried out by the coupling belts 32 and 32A themselves being severed by coming into contact with the combustion gas BG generated by an operation of the gas generator 37. Because of this, a higher coupling strength can be secured in comparison with when using a type of actuator that includes the existing operating pin, and also, a coupling state can be terminated smoothly and swiftly when operating. Therefore, for example, in an inflation mode wherein a coupling state is maintained when an airbag starts to inflate, and the coupling state is subsequently terminated at a predetermined timing, an inflation state of the airbag can be stably controlled.

Also, in the airbag device M of the embodiment, the actuators 35 and 35A are of a configuration attached to the bottom wall portion 16 of the case 15 by using only one bolt 57. Therefore, the actuators 35 and 35A can easily be attached to the bottom wall portion 16, and an attachment operation is easy.

In the embodiment, the description has been given employing a passenger seat airbag device as an example of an airbag device, but an airbag device to which the present disclosure can be applied not being limited to that in the embodiment, the present disclosure may be applied to a steering wheel airbag device. Also, in the embodiment, a configuration is such that internal pressure of an airbag is controlled by an actuator, but control of an airbag inflation aspect not being limited to internal pressure control, an airbag may be configured in such a way that forms of completed inflation may be caused to differ using an actuator.

The present disclosure relates to an airbag device of the following configuration.

The airbag device includes an airbag that inflates in such a way as to be able to protect an occupant seated in a seat owing to an inflating gas being caused to flow into an interior, a housing region in which the airbag is housed folded, and an actuator, which is attached to the housing region side and is of a configuration that causes a coupling member extending from the airbag to be coupled, and controls an inflation aspect of the airbag by causing a state of coupling with the coupling member to be maintained or terminated, wherein the coupling member is configured of a string-form body having flexibility, the actuator includes a gas generator configured in such a way as to be able to eject a combustion gas generated by a combustion of an explosive housed in an interior from an ejection port when operating, and a holder portion around which the coupling member can be wound and held, the holder portion includes a holding wall portion, which is disposed in such a way as to approximately follow a direction of ejection of the combustion gas from the ejection port and can hold the wound coupling member on an outer peripheral face side, and a top wall portion disposed in such a way as to close a leading end side separated from the gas generator in the holding wall portion, and is configured in such a way that a contact region in which the combustion gas can be brought into contact with the coupling member is disposed in a region of the holding wall portion from the ejection port to the top wall portion, and the actuator is configured in such a way that the coupling member is severed by the combustion gas being brought into contact with the coupling member in the contact region, whereby a state of the coupling member being held in the holder portion can be terminated.

In the airbag device of the present disclosure, the coupling member extending from the airbag is of a configuration wherein a state of coupling with the actuator is maintained by the coupling member being wound around and held by a holding wall portion of the holder portion in the actuator. Further, in the airbag device of the present disclosure, the gas generator of the actuator causes a combustion gas to be ejected when operating, and by the combustion gas being brought into contact with the coupling member in the contact region provided in the holder portion, the coupling member is severed by being burned apart or melted, and the state of coupling with the holder portion is terminated. That is, in the airbag device of the present disclosure, an operating pin or the like used in an actuator of an existing airbag device is unneeded, and a state of coupling between the coupling member and the holder portion can be terminated simply by the combustion gas ejected from the gas generator being brought into contact with the coupling member held in the holder portion. Therefore, a configuration can be simplified in comparison with that of the existing airbag device. Also, in the airbag device of the present disclosure, the coupling member is severed by the combustion gas being brought into contact with the coupling member in a contact region provided in the holder portion, because of which a state of coupling between the coupling member and the holder portion can be stably terminated.

Consequently, the airbag device of the present disclosure is of a simple configuration, and a state of coupling with a coupling member can be smoothly terminated when an actuator operates.

Specifically, in the airbag device of the present disclosure, it is preferably such that the holding wall portion is formed in an approximately tubular form centered on the direction of ejection of the combustion gas, and is of a configuration wherein a gas outflow hole that can cause the combustion gas to flow out toward the coupling member disposed in such a way as to cover the outer peripheral side is disposed penetrating, and the contact region is configured by the gas outflow hole.

In the airbag device of the heretofore described configuration, an end portion side of the coupling member is of a loop form, the coupling member can be caused to be held in the holder portion by the holding wall portion of the holder portion being inserted through the loop-form region, and a holding operation of causing the coupling member to be held in the holder portion is easy.

Also, in the airbag device of the heretofore described configuration, it is preferably such that the gas outflow hole is configured disposed in a region wherein both edges of the gas outflow hole on a circumferential direction side are brought into contact with the coupling member in a cross-section of a side perpendicular to an axis of the holding wall portion when mounted in a vehicle. Therefore, in the airbag device of the heretofore described configuration, the combustion gas can swiftly be caused to flow out toward the coupling member via the gas outflow hole, and the coupling member can swiftly be severed.

Furthermore, the airbag device may be such that the holding wall portion is formed in an approximately tubular form centered on the direction of ejection of the combustion gas, and has an insertion hole through which the coupling member can be inserted, and an inner peripheral side is configured as the contact region.

Further still, when the airbag device of the heretofore described configuration is of a configuration such that a cover wall covering sides of the actuator is disposed in positions on an outer side of the housing region in a periphery of the actuator in such a way as to extend from the housing region side, the cover wall can be disposed, for example, in such a way as to cover the vehicle interior side of the actuator in order that a flame, a spark, or the like generated when the gas generator operates cannot be seen from the vehicle interior side.

What is claimed is:

1. An airbag device, comprising:
an airbag that inflates in such a way as to be able to protect an occupant seated in a seat owing to an inflating gas being caused to flow into an interior;
a housing region in which the airbag is housed folded; and
an actuator, which is attached to the housing region side and is of a configuration that causes a coupling member extending from the airbag to be coupled, and controls an inflation aspect of the airbag by causing a state of coupling with the coupling member to be maintained or terminated, wherein
the coupling member is configured of a string-form body having flexibility,
the actuator includes a gas generator configured in such a way as to be able to eject a combustion gas generated by a combustion of an explosive housed in an interior from an ejection port when operating, and
a holder portion around which the coupling member can be wound and held,
the holder portion includes a holding wall portion, which is disposed in such a way as to approximately follow a direction of ejection of the combustion gas from the ejection port and can hold the wound coupling member on an outer peripheral face side, and
a top wall portion disposed in such a way as to close a leading end side separated from the gas generator in the holding wall portion,
and is configured in such a way that a contact region in which the combustion gas can be brought into contact with the coupling member is disposed in a region of the holding wall portion from the ejection port to the top wall portion, and
the actuator is configured in such a way that the coupling member is severed by the combustion gas being brought into contact with the coupling member in the contact region, whereby a state of the coupling member being held in the holder portion can be terminated.

2. The airbag device according to claim 1, wherein
the holding wall portion is formed in an approximately tubular form centered on the direction of ejection of the combustion gas, and is of a configuration wherein a gas outflow hole that can cause the combustion gas to flow out toward the coupling member disposed in such a way as to cover the outer peripheral side is disposed penetrating, and
the gas outflow hole configures the contact region.

3. The airbag device according to claim 2, wherein
the gas outflow hole is formed in a region wherein both edges of the gas outflow hole on a circumferential direction side are brought into contact with the coupling member in a cross-section of a side perpendicular to an axis of the holding wall portion when mounted in a vehicle.

4. The airbag device according to claim 1, wherein
the holding wall portion is formed in an approximately tubular form centered on the direction of ejection of the combustion gas, and has an insertion hole through which the coupling member can be inserted, and an inner peripheral side is configured as the contact region.

5. The airbag device according to claim 1, wherein
a cover wall covering sides of the actuator is disposed in positions on an outer side of the housing region in a periphery of the actuator in such a way as to extend from the housing region side.

* * * * *